UNITED STATES PATENT OFFICE.

JACOB HINKLEIN, OF NEW YORK, N. Y.

IMPROVEMENT IN FIRE-CLAY OR CEMENT TO MAKE THE JOINTS OF STOVES AND FIRE-PLACES.

Specification forming part of Letters Patent No. 220,715, dated October 21, 1879; application filed September 10, 1879.

*To all whom it may concern:*

Be it known that I, JACOB HINKLEIN, of New York, in the State of New York, have invented a new and Improved Compound called "Fire-Clay," which compound is fully described in the following specification.

This invention relates to that class of compounds used in the manufacture of stoves and fire-places to make tight joints, or to protect the iron from the heat of the fire; and it consists in a composition formed by mixing clay, iron-filings, salt, cow-hair, and animal blood, which, when exposed to the heat of the fire, will become perfectly hard.

To prepare this fire-clay, take of earth or common clay five (5) pounds and of previously-burned clay two (2) pounds, which are ground fine, and then mix or saturate the same with about one (1) quart of animal blood, (oxen blood.) Then take two (2) pounds of iron-filings, one (1) pound of salt, and about one (1) ounce of cow-hair, and mix the whole well together, and then with the earth and clay, which was previously saturated with blood, after which this mixture is ready for use.

This fire-clay, when exposed to the heat of the fire, will become perfectly hard, and will not easily break or crack.

What I claim as my invention, and desire to secure by Letters Patent, is—

A compound consisting of common earth or clay and burned clay, in combination with iron-filings, salt, cow-hair, and animal blood, substantially as and for the purpose specified.

JACOB HINKLEIN.

Witnesses:
HENRY E. ROEDER,
J. B. NONES.